Nov. 7, 1967    I. L. PHILLIPS ET AL    3,351,031
PLANTING METHOD
Filed Dec. 1, 1965
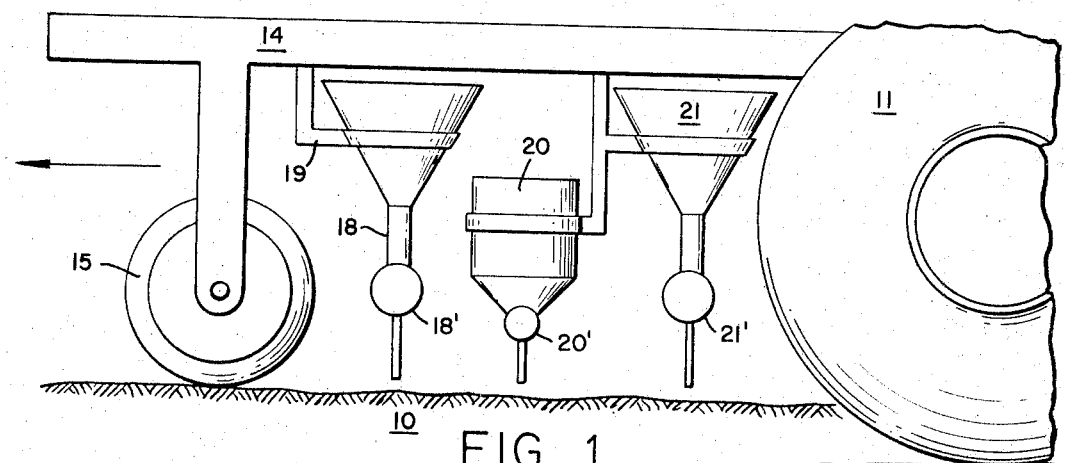
FIG_1
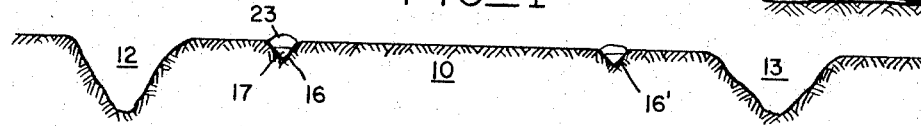
FIG_2
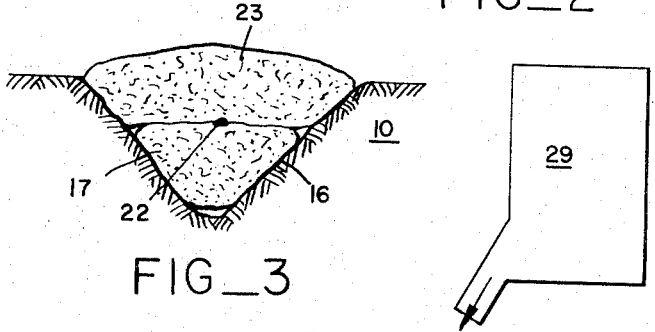
FIG_3
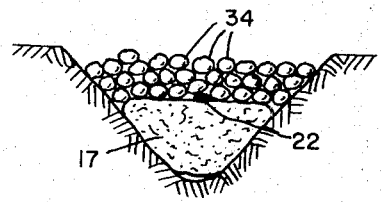
FIG_4
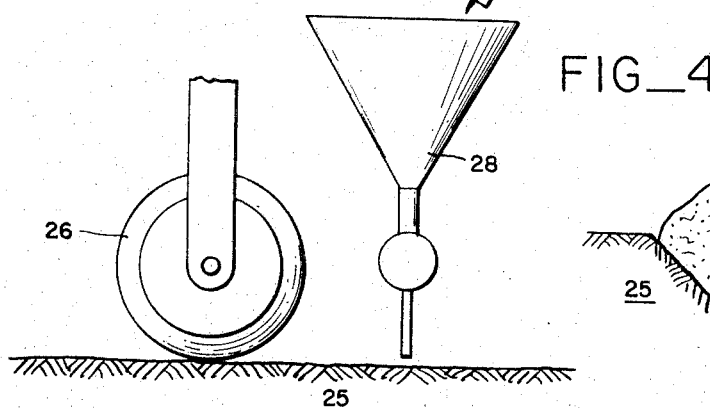
FIG_3a
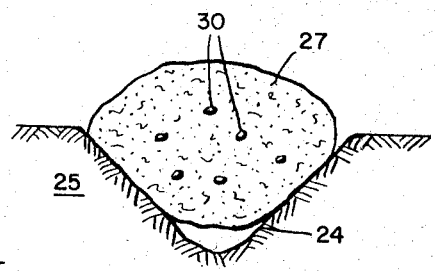
FIG_5
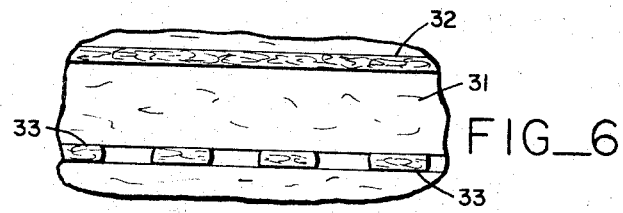
FIG_6
INVENTORS
IRVINE L. PHILLIPS
BY   DAVID B. SCOTT
ATTORNEYS

United States Patent Office 3,351,031
Patented Nov. 7, 1967

3,351,031
PLANTING METHOD
Irvine L. Phillips and David B. Scott, Salinas, Calif.,
assignors to Soilserv, Inc., Salinas, Calif.
Filed Dec. 1, 1965, Ser. No. 510,747
13 Claims. (Cl. 111—1)

This invention relates to the planting of crops and particularly to the art of precision planting of seeds in a preformed and controlled media designed to enhance germination and growth of the seeds.

Precision planting of seeds is a technique utilized for a number of reasons. Uniformity of the seed distribution itself produces an optimal utilization of the land with a minimum quantity of seeds. Of most importance, however, in connection with the techniques of precision planting is the achievement of uniform germination of the seeds. If the seeds all germinate within about the same period of time, harvest can occur over the entire area at the same time. The result is a gross savings through avoidance of harvesting more than once due to uneveness in the growth of the crops.

Some attempts have already been made in the area of pretreating or handling seeds so that they will germinate at a relatively uniform period of time. For example, one technique proposed has been to incorporate the seeds in a plastic tape. The tape provides the entire environment for the seeds through germination by including as a surrounding body various nutrients required by the seeds for germination. The tape is costly to manufacture and requires care in placement in the field so that it will not be blown away before the plants have taken root.

The present invention departs from all other efforts and achieves an exceptional uniformity of seed planting in a manner characterized by its utter simplicity, and all of this during a single pass through the field to be planted. The entire operational aspect of the present method can be executed at one selected time and no further attention to the planted areas need be given until the crops have germinated and need their usual attention. The media within which the seeds are deposited in accordance with this invention is entirely self-sufficient for propagation of the seeds. At the same time, the media together with the novel technique of its placement in the soil assures that the seeds will remain and grow in the spot where they are initially deposited.

More specifically, in one embodiment the present invention contemplates distributing the seeds in a media formed from a fibrous mulch in gel form, such as a wood fiber gel. Plant growth nutrients and suitable agricultural chemicals may be included in the gel. In this embodiment, the gel contains the seeds and both are extruded into place at the same time. Most advantageously, a groove or channel is preliminarily formed in the surface of the soil to be planted and the media in a snake-like configuration is deposited directly, either continuously or discontinuously, into the groove. The media has sufficient weight that together with the protection afforded by the groove, it will not be disturbed by the elements. In due course, the plants germinate at approximately the same time.

In the preferred embodiment, one or more grooves or channels are suitably formed in the top of a seed bed and an extrusion device is used to deposit the seed growth media. The extruder is moved along directly behind the mechanism for forming the channels so that in one pass over the seed bed the entire operation is accomplished. In laying down the seed growth media with its fibrous gel consistency, it has been found that the incorporation of a lubricant in the media greatly facilitates its discharge through an extruder. As will be discussed more thoroughly hereinafter, the lubricant is formed from a water soluble gel-forming polymer and a dry powdered solid hydrophobic grease.

In the accompanying drawing:

FIG. 1 shows in a schematic side elevation a portion of apparatus useful in practicing the present method.

FIG. 2 shows in end section a portion of a seed bed with adjacent furrows within which the present seeds and growth media have been deposited in accordance with the method.

FIG. 3 shows in end section an enlarged portion of the seed bed of FIG. 2 in the area of the channel and seed growth media.

FIG. 3a is a similar view illustrating an alternative for covering the top of the seeds.

FIG. 4 is a schematic side elevation of a portion of apparatus useful in performing an alternate embodiment of the present method.

FIG. 5 is an end section of a channel and seed growth media that has been deposited in accordance with the alternate embodiment of FIG. 4.

FIG. 6 is a top elevation portion of a seed bed showing two strips of media where one strip has been continuously deposited and one strip has been deposited discontinuously in the top of a seed bed.

With reference to the drawing, FIG. 1 in particular, the present method may be practiced on a typical seed bed 10 with the aid of a suitable vehicle such as a tractor, the wheels of which are shown at 11. Tractor wheels 11 suitably move through furrows such as 12 and 13 shown in FIG. 2 on either side of seed bed 10. The vehicle selected preferably will include a supporting beam 14 from which a groove cutting wheel 15 is suitably depended. By moving the vehicle along over the seed bed 10 with wheel 15 in contact with the surface of bed 10, a groove or channel 16 is excised from the surface of bed 10.

As illustrated in FIG. 2, a number of grooves and depositions of seed growth media can proceed simultaneously, although for simplicity only groove 16 will be discussed in detail. For example, a channel 16' as shown in FIG. 2 could be formed simultaneously with channel 16 with a duplicate set of equipment and all comments applicable to channel 16 apply equally well to such other grooves and the contents deposited therein.

Following formation of groove or channel 16, a continuous snake-like mass of growth media 17 is suitably deposited into channel 16 from an extrusion device 18 containing the materials for forming media 17.

Extruder 18 is suitably mounted on beam 14 by bracket 19. Immediately behind extruder 18 a conventional precision seed planter 20 is depended from beam 14 adapted to drop seeds such as seed 22 within channel 16 on top of media 17 at a preselected frequency.

Behind seed planter 20 is a second extruder 21 depended from beam 14 which deposits a media or composition 23 similar to media 17 on top of seed 22 to surround the seed as illustrated most clearly in FIG. 3. Media 23 is extruded into place and in a continuous snake-like form, the same as with media 17, so that the entire operation is rapid, simple and executed in a single pass over the field. Where media 17 and 23 are suitably selected for enhancing the growth of seed 22, precision planting and uniformity of germination and growth are obtained.

FIGURE 3a illustrates an alternative to using media 23 as a top or covering layer for seed 22. Instead of an extruded mass, a plurality of pellets 34 are deposited as by dropping so as to cover seed 22. The lower layer 17 of growth media is supplied as before and illustrated in FIGURE 3.

The pellets may be conveniently dropped from a unit similar to said planter 20 which may be installed to take the place of second extruder 21.

Pellets have some advantages over the use of a snake-like media as a top layer. A significant practical advantage is gained through the savings of weight and bulk. The extruded media contains moisture and is an expanded form as compared to the dry compressed pellets. Cost of shipping to the point of use, as well as savings in design of the unit used in the field, are thereby achieved with the pellet technique. The pellets are conveniently pre-formed before being distributed in the field, whereas it is likely that the extruded material will be formulated near or on the vehicle which traverses the field. The operator of the vehicle or an assistant will have to add the material in proper proportions for the extruder. Pre-forming pellets in a controlled operation will generally lead to more uniformity and avoidance of errors in proportions for the formulation. Finally, the plant can more readily grow upwardly through the pellet layer than through the relatively more solid extruded layer.

Preferably the pellet is formed to have a diameter of about 1/8 to 3/16 of an inch and possibly up to about 1/4 of an inch. They are most advantageously made from a swellable mulch material of a nonphytotoxic nature. Exemplary of such materials are rice hull, bran and apple pomace. In the preferred embodiment the material used for forming the pellet is of the type that is swellable in a "laminar" pattern, i.e. the pellet stratifies and increases in volume in layers as opposed to a general integral swelling of the spherical mass. The above materials behave in this manner. Other typical materials which exhibit this type of swelling are the vermiculites which could be used as equivalents in this context. By swelling in a laminar pattern, the materials tend to break in the same pattern. The laminar swelling and breaking of the pellet avoids crusting of the soil and requires in general less volume to cover the seed than a material which does not exhibit the laminar type swelling.

In formulating the pellet, it is contemplated that agricultural chemicals, nutrients, humectants and other materials which may be included in the extruded mass are similarly added in the pellet formula if desired.

Best results in using the pellet for a top layer are accomplished if a light spray of water is applied to the pellets after their placement. By adding a small amount of moisture to the pellets, their swelling is triggered and the curd is broken. This serves to expose more faces of the pellet component so that it will readily pick up and absorb moisture from the air and soil for completion of the swelling process. The water can be conveniently applied from a conventional spray head mounted on the rear of the tractor or vehicle used for laying down the pellets.

In the alternate embodiment of FIGS. 4 and 5, the planting is accomplished in a similar manner to that of FIGS. 1–3 in that a channel or groove 24 is first cut in the seed bed 25 by groove wheel 26 and the seed growth media 27 deposited therein by extrusion from extruder 28. In this case, however, only one extruder is used and the entire mass deposited as a homogeneous unit. In accomplishing this, all of the ingredients including seeds are first combined and uniformly mixed in mixer 29 before introducing the mass to extruder 28. When the mass is then extruded into place, media 27 will contain seeds 30 distributed therein. Uniform growth patterns are likewise accomplished.

FIG. 6 illustrates the appearance of a planted bed treated in accordance with this method. Thus, a seed bed 31 contains a pair of parallel planted areas 32 and 33 of growth media in both continuous and discontinuous snake-like forms that has been laid down in grooves which were preformed in the top of bed 31. Continuous area 32 is created by continuously extruding (or dropping pellets for the top layer) with the type of apparatus discussed. The discontinuous pattern of area 33 can be formed with the same equipment operated in intermittent fashion. If the embodiments of FIGS. 1–3 is followed, it will be important to coordinate the operation of the three discharging elements 18, 20, and 21 so that they all discharge over the appropriate spots. Programming can be accomplished in a number of ways. Connecting a discharge valve 18', 20', 21' in each element to a ground engaging timing wheel (not shown) of the type commonly used in seed planters is one good way of obtaining proper coordination.

The non-pelletized growth media used for extrusion is basically formed from a fibrous mulch. Preferred materials are those of a wood fiber nature. Typical examples of commercially available products of this type include Turfiber, a product of International Paper Co. Turfiber is a wood cellulose mulch made from 100% virgin wood pulp. It looks and feels like raw cotton. Another useful material of this type is known as Silva-Fiber, a product of Weyerhaeuser Co., and is also a natural wood fiber product that is produced from clear whole wood by a gentle rubbing action. It is composed of highly resilient fiber bundles having great internal friction.

As noted in the preferred embodiment, the wood fiber mulch is made up in a gel consistency and extruded directly into place. In order to extrude the material without stoppages, it is essential to include a lubricant. The lubricant is preferably made from a water soluble gel-forming polymer to thicken and intensify the gel consistency of the media. Most preferably, the polymer is cellulose derived with typical examples being the alkyl cellulose such as carboxymethyl cellulose and hydroxyethyl cellulose. A with typical examples being the alkyl celluloses such as Cellosize, a product of Union Carbide Chemicals, which is a hydroxyethyl cellulose.

The other element in the lubricant is a water insoluble, dry grease. The principal requirement for this material is that it be water insoluble or hyrdophobic. A typical example of such a material is the commercial product known as Dry-Flo (National Starch Products) which is a dry, powdered solid that is hydrophobic. Its composition is indicated as being a modified starch ester and is highly resistant to wetting by water.

The media suitably contains in addition to seeds, the other ingredients essential and desirable for propagation of the seeds. The mulch or gel media, of course, contains a substantial amount of moisture which is essential to plant growth which also serves to create the desired gel consistency. In addition, it is contemplated that fertilizer, for example, and other agricultural chemicals, such as insecticides, fungicides, growth regulators and other solids will be incorporated into the media in suitable quantities.

Where the technique of the alternate embodiment of FIGS. 4 and 5 is used, all of these ingredients are blended into a relatively homogenized condition together with the seeds. If the first embodiment of FIGS. 1–3 is followed, the seeds are not mixed with the other ingredients at the initial stage but only after and during deposition of the media onto the soil.

Where desirable, and specifically in arid climates, it may be beneficial to add a humectant to the media, such as propylene glycol, to retain moisture in the growth media for extended periods of time.

After initial drying of the media following planting, the desired fibrous gel structure remains, which by its nature retains sufficient moisture for plant growth and also avoids crusting of the soil. With this preformed and tailored media containing the various agricultural chemicals and nutrients, a uniform and easy germination is obtained.

The proportions of the various ingredients used in making up the fibrous gel mulch are variable depending upon the precise materials used and the type of equipment used in their application. For example, the amount of lubricant added to the fibrous mass will depend on the viscosity of the lubricant. Viscosity of the lubricant in turn depends on the viscosity grade of the water soluble polymer used for thickening. Suffice it to state that enough seeds and seed growth components are included in the fibrous mass to promote the growth of the crop sought, and where extrusion is used for application, the necessary quantity of lubricant is added to promote a smooth and steady extrusion of the mass onto the seed bed. Precise quantities are quickly established with minimum experience.

As a typical example of a workable formula, the following figures are given. It should be understood that they are representative and not limiting.

The fibrous gel is made up in an aqueous solution. For each 1 gallon of water, 80 g. of Silva-Fiber wood fibers are added. To this, sufficient seed fertilizer, insecticide, fungicide and other growth regulators and nutrients are added so as to constitute about 0.5% by weight per gallon of water. A lubricant is added thereto comprising about 15 g. of Cellosize hydroxyethyl cellulose, viscosity 15,000 cps. (The amount of water soluble polymer may vary from about 0.25–5% by weight of the mass depending upon the viscosity grade.) In addition, Dry-Flo modified starch ester hydrophobic lubricant is added in an amount of about 0.5% by weight. (The lubricant in this case can be varied over a range of about 0.5–2% by weight.) The entire mass is blended thoroughly for uniformity and then is ready for extrusion into place in a groove that is preformed as described earlier. By use of the water soluble polymer and solid hydrophobic lubricant the extrusion proceeds smoothly.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In the planting of seeds in a seed bed, the improved method comprising: extruding a viscous solution of a plant growth media through a die directly onto said seed bed, depositing seeds on said extruded media, and enclosing said seeds by covering the seeds with a mulch material; said media being sufficiently viscous to substantially retain its extruded shape on the seed bed.

2. The method in accordance with claim 1 wherein said mulch material used to cover said seeds is deposited in pellet form thereover.

3. The method in accordance with claim 2 wherein said pellets are comprised of a mulch material swellable with water in a laminar pattern.

4. The method in accordance with claim 3 wherein said pellets are comprised of a vermiculite.

5. The method in accordance with claim 2 and including the step of spraying a sufficient amount of water over the pellets after depositing them on said seeds to initiate the swelling thereof.

6. The method in accordance with claim 1 wherein said mulch material is a viscous plant growth media solution and is deposited to complete the enclosure of said seeds by extruding the media through a die directly onto said seeds.

7. In the planting of seeds in a seed bed, the improved method comprising: depositing seeds in a seed bed; and extruding a viscous solution of plant growth media through a die directly onto said seed bed to enclose said seeds; said media being sufficiently viscous to substantially retain its extruded shape on the seed bed.

8. The method in accordance with claim 7 wherein said seeds are deposited on said seed bed at spaced intervals.

9. The method in accordance with claim 7 wherein the said plant growth media is extruded and deposited on the seed bed in a continuous pattern.

10. The method in accordance with claim 7 wherein the media is extruded and deposited on the seed bed in a discontinuous pattern.

11. The method in accordance with claim 7 wherein said plant growth media is intermixed with said seeds prior to extrusion and the media and seeds are extruded and deposited on the seed bed as a unitary mass.

12. The method in accordance with claim 7 wherein said viscous media is comprised of a fibrous material and contains a lubricant to facilitate the extrusion thereof.

13. The improved method in accordance with claim 12 wherein the viscous media is comprised of wood fibers and a water soluble gel-forming polymer, and said lubricant is a dry hydrophobic grease.

References Cited

UNITED STATES PATENTS

| | | | |
|---|---|---|---|
| 1,882,377 | 10/1932 | Whittelsey | 47—9 |
| 2,787,864 | 4/1957 | Eck et al. | 47—58 |
| 2,802,303 | 8/1957 | Weeks | 47—9 |
| 2,927,402 | 3/1960 | Goren et al. | 47—58 |
| 2,957,834 | 10/1960 | Moller et al. | 260—17.2 |
| 2,974,030 | 3/1961 | Geary | 47—58 X |
| 3,017,720 | 1/1962 | Busch | 47—58 |
| 3,024,570 | 3/1962 | Dow | 47—58 |
| 3,110,129 | 11/1963 | Baumann | 47—58 |
| 3,149,588 | 9/1964 | Gatzke | 111—1 |

FOREIGN PATENTS 939,885  5/1948  France.

OTHER REFERENCES

"Sowing Seeds in Fluid," Farm Implement and Machinery Review, July 1, 1963, pp. 959–60 relied on.

ROBERT E. BAGWILL, *Primary Examiner.*